United States Patent
Kim et al.

(10) Patent No.: US 10,853,641 B2
(45) Date of Patent: Dec. 1, 2020

(54) APPARATUS AND METHOD FOR ACQUIRING IRIS IMAGE OUTDOORS AND INDOORS

(71) Applicants: IRITECH, INC., Fairfax, VA (US); Dae Hoon Kim, Seoul (KR)

(72) Inventors: Dae Hoon Kim, Seoul (KR); Hyeong In Choi, Seoul (KR); Byoung Jin Jun, Seoul (KR); Haeng Moon Kim, Gwacheon-si (KR); Seung Min Paik, Seoul (KR)

(73) Assignees: IRITECH, INC., Fairfax, VA (US); Dae Hoon Kim, Seoul (KR)

( * ) Notice: Subject to any disclaimer, the term of this patent is extended or adjusted under 35 U.S.C. 154(b) by 0 days.

(21) Appl. No.: 15/309,439

(22) PCT Filed: May 8, 2015

(86) PCT No.: PCT/KR2015/004590
§ 371 (c)(1),
(2) Date: Nov. 7, 2016

(87) PCT Pub. No.: WO2015/170909
PCT Pub. Date: Nov. 12, 2015

(65) Prior Publication Data
US 2017/0185839 A1 Jun. 29, 2017

(30) Foreign Application Priority Data
May 8, 2014 (KR) .................. 10-2014-0054662

(51) Int. Cl.
*G06K 9/00* (2006.01)
*G06K 9/20* (2006.01)

(52) U.S. Cl.
CPC ..... *G06K 9/00604* (2013.01); *G06K 9/00597* (2013.01); *G06K 9/20* (2013.01);
(Continued)

(58) Field of Classification Search
None
See application file for complete search history.

(56) References Cited

U.S. PATENT DOCUMENTS

2007/0171297 A1* 7/2007 Namgoong ........ G06K 9/00604
348/362
2008/0278445 A1* 11/2008 Sweetser ............... G06F 3/0325
345/158

FOREIGN PATENT DOCUMENTS

KR   10-0729813 B1   6/2007
KR   100729813 B1 *  6/2007 ......... G06K 9/00604
(Continued)

OTHER PUBLICATIONS

PCT International Search Report for PCT Counterpart Application No. PCT/KR2015/004590, 5 pp. (including English translation), (dated Aug. 18, 2015).

(Continued)

*Primary Examiner* — Fred H Hu
(74) *Attorney, Agent, or Firm* — Seed IP Law Group LLP (57) ABSTRACT

The present invention relates to an apparatus and a method for acquiring an iris image outdoors and indoors and, specifically, to an apparatus and a method for acquiring an iris image outdoors and indoors, the apparatus comprising: a lens for receiving the iris image; an image sensor for sensing the iris image inputted through the lens; and a memory for storing the iris image sensed by the image sensor, wherein a band-pass filter using all or parts of outdoor iris recognition wavelength bands (920-1,500 nm) in order to acquire the iris image in which a reflected image is prevented or a reflected noise is reduced, which are generated when the iris image is photographed indoors and outdoors and, particularly, outdoors, is provided at the front end of the image sensor, and an infrared lighting having at (Continued)

least one wavelength passing through the wavelength bands of the provided band-pass filter is provided.

9 Claims, 9 Drawing Sheets

(52) U.S. Cl.
CPC ......... *G06K 9/2018* (2013.01); *G06K 9/2027* (2013.01); *G06K 2209/05* (2013.01)

(56) References Cited

FOREIGN PATENT DOCUMENTS

| KR | 100729813 B1 | * | 6/2007 | ......... G06K 9/00604 |
| KR | 20110034216 A | * | 6/2007 | ............. G06F 3/011 |
| KR | 10-2011-0034216 A | | 4/2011 | |
| KR | 20110034216 A | * | 4/2011 | |
| KR | 10-2013-0123859 A | | 11/2013 | |

OTHER PUBLICATIONS

PCT Written Opinion of the International Searching Authority for PCT Counterpart Application No. PCT/KR2015/004590, 66 pp. (dated Aug. 18, 2015).

* cited by examiner

APPARATUS AND METHOD FOR ACQUIRING IRIS IMAGE OUTDOORS AND INDOORS

CROSS-REFERENCE TO RELATED APPLICATIONS

This patent application is a U.S. National Phase Application under 35 U.S.C. § 371 of International Application No. PCT/KR2015/004590, filed May 8, 2015, entitled APPARATUS AND METHOD FOR ACQUIRING IRIS IMAGE OUTDOORS AND INDOORS, which claims priority to Korean Patent Application No. 10-2014-0054662, filed May 8, 2014.

TECHNICAL FIELD

The present invention relates to an apparatus and method for acquiring an iris image indoors and outdoors and, more particularly, to an apparatus for acquiring an iris image indoors and outdoors, which includes a lens for receiving the iris image, an image sensor for sensing the iris image received through the lens, a memory for storing the iris image sensed by the image sensor, a bandpass filter using all or parts of an outdoor iris recognition wavelength range (920 nm to 1,500 nm) provided at a front stage of the image sensor in order to acquire the iris image, in which reflected images generated upon photographing the iris image outdoors and indoors and, more particularly, outdoors is prevented or reflection noise is reduced, and infrared lamps for emitting light having one or more wavelengths passing through a wavelength band of the bandpass filter, and a method thereof.

BACKGROUND ART

In general, iris recognition is a biometric method. A fingerprint which is the most widely used biometric feature has 40 identification features, whereas an iris has 266 identification features. Thus, the iris recognition method has a very high recognition rate as compared to the other biometric methods.

In such iris recognition, the iris of a person to be photographed is extracted and compared with those extracted from other images to perform confirmation or identification. In such a process, it is most important to photograph and acquire a recognizable iris image from the iris of the person to be photographed.

To this end, in iris recognition, the iris is generally photographed using an infrared lamp instead of a visible lamp which is widely used to capture the other images.

There are various reasons why the infrared lamp is used to photograph the iris. In particular, the infrared lamp is used to prevent the recognition rate of the iris image photographed by the camera from being reduced due to noise caused by reflection of light generated in the visible band.

According to the 2011 version (currently, the latest version) of ISO/IEC 19794-6 which is used by almost all iris recognition-related companies and organizations, a lamp for emitting light having a near infrared region of 700 to 900 nm is recommended upon photographing the iris.

However, a lamp for emitting light having a wavelength band of 700 to 900 nm (recommended in the 2011 version of ISO/IEC 19794-6) used by almost all iris recognition-related companies and organizations is applicable to an indoor environment having a light intensity of up to several thousands of lux. However, in an outdoor environment having a light intensity of several tens of thousands of lux to 130,000 lux, it is impossible to reduce noise caused by light reflection using the lamp for emitting light having a near infrared region of 700 to 900 nm. Therefore, outdoor iris recognition has been impossible.

In order to recognize the iris in an outdoor environment, in India (UIDAI project (2010)), which first applied iris recognition to issuing of the identity, an additional device such as goggles is attached to an iris recognition camera to make an outdoor environment similar to an indoor environment to acquire an iris image like IriMagic 1000BK of Iritech.

Although Korea Unexamined Patent Publication No. 10-2013-0123859 discloses technology of photographing an iris image using a normal digital (color) camera without an infrared lamp which is widely used to acquire the iris image, a problem that light reflected from peripheral things (subjects) is irradiated on an iris region, making an iris image unclear such that iris recognition accuracy is reduced is not disclosed. In addition, a very strong visible lamp should be used to acquire a clear iris image and the person to be photographed may be dazzled, causing the person to be photographed discomfort.

In addition, it is substantially impossible to add an additional device such as goggles to various mobile devices widely used in an outdoor environment, such as smartphones, tablets, PDAs, PCs or laptops, in order to photograph an iris image.

Accordingly, there is a need for an apparatus and method for photographing an iris image using various mobile devices such as smartphones, tablets, PDAs, PCs or laptops or security devices such as CCTVs, door-related devices such as door locks, or image devices such as cameras, video devices or camcorders, which is capable of overcoming the limitation in acquisition of the iris image in an outdoor environment and increasing user convenience while sufficiently considering a physical space and an economic cost problem.

SUMMARY

An object of the present invention devised to solve the problem lies in an apparatus and method for acquiring an iris image indoors and outdoors, in which a bandpass filter using all or a part of an outdoor iris wavelength range (920 nm to 1,500 nm) is provided at a front stage of the image sensor in order to acquire the iris image, in which a reflected image generated upon outdoor photographing is prevented or reflection noise is reduced, and an infrared lamp for emitting light having one or more wavelengths passing through a wavelength band of the bandpass filter is provided.

Another object of the present invention is to provide an apparatus and method for acquiring an iris image indoors and outdoors, in which a bandpass filter using all or a part of an outdoor iris wavelength range (920 nm to 1,500 nm) is provided at a front stage of the image sensor in order to acquire the iris image, in which a reflected image generated upon indoor and outdoor photographing is prevented or reflection noise is reduced, and an infrared lamp for emitting light having one or more wavelengths passing through a wavelength band of the bandpass filter is provided.

Another object of the present invention is to provide an apparatus and method for acquiring an iris image indoors and outdoors, in which a bandpass filter for passing a near infrared region of 700 to 900 nm according to the 2011 version of ISO/IEC 19794-6 is used upon indoor photographing, a bandpass filter using all or a part of an outdoor iris recognition wavelength range (920 to 1,500 nm) is used in order to reduce or prevent a reflected image generated upon outdoor photographing, and one or more infrared lamps having one or more wavelengths passing through the wavelength bands of the bandpass filters are provided.

The object of the present invention can be achieved by providing an apparatus for acquiring an iris image outdoors and indoors, which includes a lens for receiving the iris image, an image sensor for sensing the iris image received through the lens, a memory for storing the sensed iris image, a bandpass filter using all or a part of an outdoor iris wavelength range (920 nm to 1,500 nm) provided at a front stage of the image sensor in order to acquire the iris image, in which a reflected image generated upon photographing the iris image outdoors is prevented or reflection noise is reduced, and an infrared lamp for emitting light having one or more wavelengths passing through a wavelength band of the bandpass filter.

More specifically, at least one of a bandpass filter using a wavelength band of 920 to 960 nm, a wavelength band of 1,110 to 1,160 nm and a wavelength band of 1,300 to 1,500 nm or a bandpass filter using only specific wavelengths included in the outdoor iris wavelength range (920 nm to 1,500 nm) is used as the bandpass filter using all or part of the outdoor iris wavelength range (920 nm to 1,500 nm).

In another aspect of the present invention, provided herein is an apparatus for acquiring an iris image outdoors and indoors, which includes a lens for receiving the iris image, an image sensor for sensing the iris image received through the lens, a memory for storing the sensed iris image, a bandpass filter using all or a part of an outdoor iris wavelength range (920 nm to 1,500 nm) provided at a front stage of the image sensor in order to acquire the iris image, in which a reflected image generated upon photographing the iris image indoors and outdoors is prevented or reflection noise is reduced, and an infrared lamp for emitting light having one or more wavelengths passing through a wavelength band of the bandpass filter.

In another aspect of the present invention, provided herein is an apparatus for acquiring an iris image outdoors and indoors, which includes a lens for receiving the iris image, an image sensor for sensing the iris image received through the lens, and a memory for storing the sensed iris image, wherein a bandpass filter for passing a near infrared region of 700 to 900 nm according to the 2011 version of ISO/IEC 19794-6 is used upon indoor photographing, a bandpass filter using all or a part of an outdoor iris recognition wavelength range (920 to 1,500 nm) is used in order to reduce or prevent a reflected image generated upon outdoor photographing, and one or more infrared lamps having one or more wavelengths passing through the wavelength bands of the bandpass filters are provided.

In the present invention, a bandpass filter using all or a part of an outdoor iris wavelength range (920 nm to 1,500 nm) is provided at a front stage of an image sensor to prevent a reflected image generated upon outdoor photographing or reduce reflection noise. Accordingly, it is possible to acquire a recognizable iris image.

In the present invention, a bandpass filter using all or a part of an outdoor iris wavelength range (920 nm to 1,500 nm) is provided at a front stage of an image sensor in order to prevent a reflected image generated upon indoor and outdoor photographing or reduce reflection noise. Accordingly, it is possible to acquire a recognizable iris image indoors and outdoors.

In the present invention, a bandpass filter for passing a near infrared region of 700 to 900 nm according to the 2011 version of ISO/IEC 19794-6 is used upon indoor photographing, a bandpass filter using all or a part of an outdoor iris recognition wavelength range (920 to 1,500 nm) in order to prevent a reflected image generated upon outdoor photographing or reduce reflection noise is provided at a front stage of an image sensor. Accordingly, it is possible to acquire a recognizable iris image indoors and outdoors.

DETAIL DESCRIPTION

The present invention provides an apparatus for acquiring an iris image outdoors and indoors, which includes a lens for receiving the iris image, an image sensor for sensing the iris image received through the lens, a memory for storing the sensed iris image, a bandpass filter using all or a part of an outdoor iris wavelength range (920 nm to 1,500 nm) provided at a front stage of the image sensor in order to acquire the iris image, in which a reflected image generated upon photographing the iris image outdoors is prevented or reflection noise is reduced, and an infrared lamp for emitting light having one or more wavelengths passing through a wavelength band of the bandpass filter.

The embodiments of the present invention will now be described in detail.

The configuration and operation of the embodiments of the present invention will be described with reference to the accompanying drawings. The configuration and operation of the present invention shown in the drawings and described hereinafter will be described in at least one embodiment, without limiting the spirit and scope of the present invention.

Accordingly, various modifications and variations of the core components of an apparatus and method for acquiring an image for iris recognition outdoors can be made by an ordinary person skilled in the art, to which the present disclosure pertains, without departing from the scope of the invention.

It will be understood that, although the terms A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "included in", or "configured in" another element, a further element may be "connected", "included", or "configured" between one element and another element although one element may be directly connected to or directly coupled to another element.

In addition, in the present invention, the same components are denoted by different reference numerals in different figures, for enhancement of understanding.

[Embodiment]

The embodiments of the present invention will be described in detail.

In general, an iris recognition method includes acquiring an image of an eye including an iris through a camera, extracting an iris region from the image of the eye, detecting a personal unique feature from the extracted iris region and determining similarity between two compared iris features. Accordingly, if the iris image acquired through the camera is distorted, iris recognition cannot be properly performed.

The iris image is generally distorted due to reflection noise of light generated in a visible band. In general, in iris recognition, in order to prevent the recognition rate of the iris image from being reduced due to reflection noise of light generated in the visible band, the iris is photographed using an infrared lamp instead of a visible lamp. Actually, almost all iris recognition-related companies and organizations use a lamp for emitting light having a near infrared region of 700 to 900 nm recommended by ISO/IEC 19794-6 (2011).

However, unlike an indoor environment having a light intensity of up to several thousands of lux, in an outdoor environment having a light intensity of several tens of thousands of lux to 130,000 lux, it is impossible to reduce a noise caused by light reflection using a lamp for emitting light having a near infrared region of 700 to 900 nm. Therefore, iris recognition has been impossible in the outdoor environment.

Figure 1:
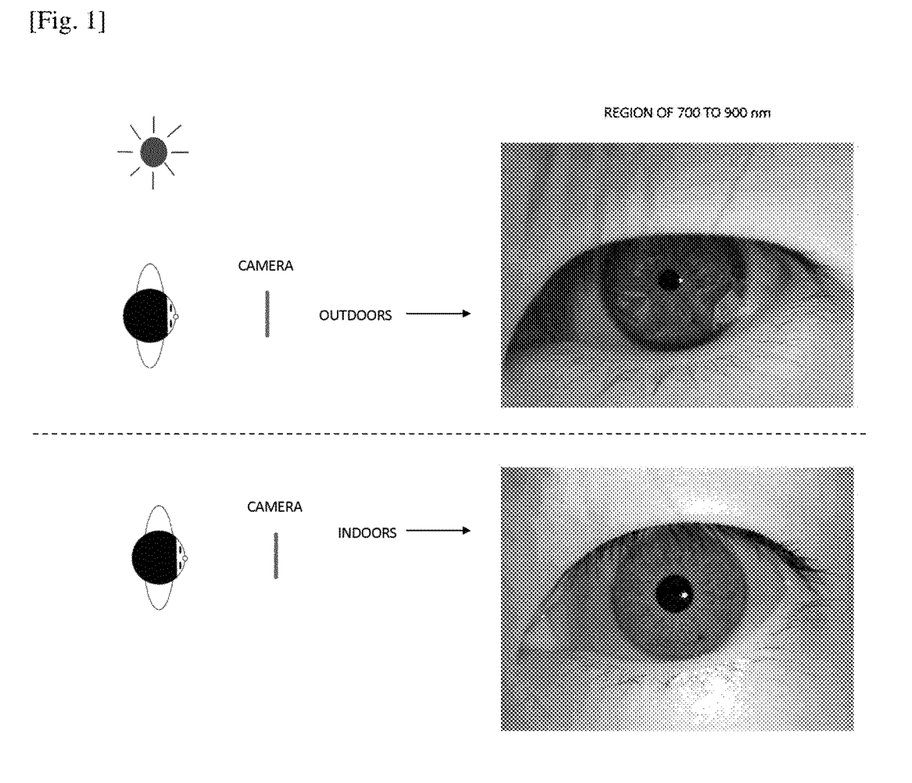
FIG. 1 is a diagram showing iris images acquired when the iris of the same person is photographed using a lamp for emitting light having a near infrared region of 700 to 900 nm in indoor and outdoor environments according to an embodiment of the present invention.

FIG. 1 is a diagram showing iris images acquired when the iris of the same person is photographed using a lamp for emitting light having a near infrared region of 700 to 900 nm in indoor and outdoor environments according to an embodiment of the present invention.

FIG. 1 shows the iris images of the left eye of the same person photographed using the same iris photographing camera. It can be seen that, in the outdoor environment, the reflected image of a surrounding environment appears in the eye due to sunlight having a high intensity even when a lamp for emitting light having a near infrared region of 700 to 900 nm is used, unlike the indoor environment. As shown in FIG. 1, unlike the iris image photographed indoors, the iris recognition rate of the iris image photographed outdoors is remarkably reduced such that iris recognition is substantially impossible.

Figure 2:
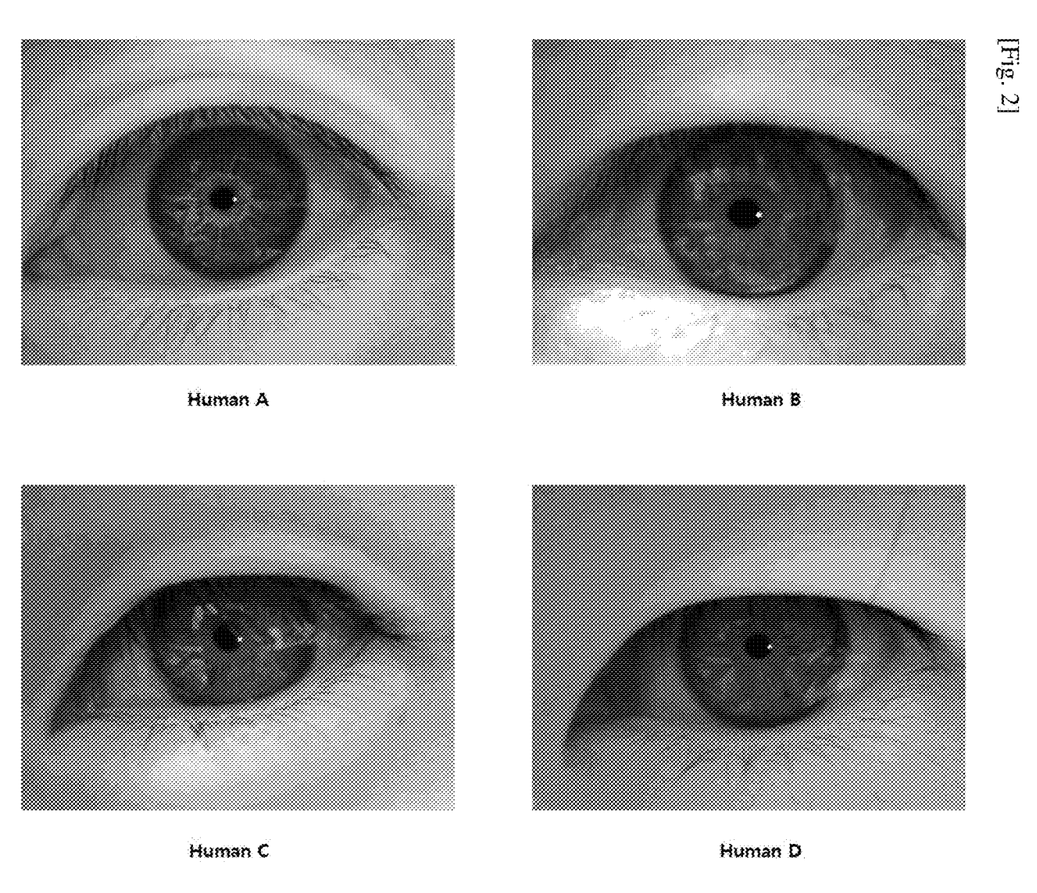
FIG. 2 is a diagram showing the iris images of various persons acquired using a lamp for emitting light having a near infrared region of 700 to 900 nm in an outdoor environment according to an embodiment of the present invention.

FIG. 2 is a diagram showing the iris images of four persons acquired using a lamp for emitting light having a near infrared region of 700 to 900 nm in an outdoor environment according to an embodiment of the present invention.

FIG. 2 shows the iris images of four persons selected from data including the iris images acquired by photographing the left eyes of various persons using the same iris photographing camera in the same outdoor environment. It can be seen that reflected images of a surrounding environment appear in the eyes.

Accordingly, as shown in FIGS. 1 and 2, it can be seen that an iris image clear enough to recognize the iris cannot be substantially acquired in the outdoor environment using the lamp for emitting light having the near infrared region of 700 to 900 nm (recommended in the 2011 version of ISO/IEC 19794-6) used by almost all iris recognition-related companies and organizations.

Accordingly, in the present invention, in order to overcome the limits of the method of using the lamp for emitting light having the near infrared region of 700 to 900 nm in the outdoor environment, the principle of acquiring an iris image in a new wavelength range will be described. In addition, for convenience of description, the wavelength range of the near infrared region of 700 to 900 nm is referred to as an ISO-recommended wavelength range and a new wavelength range, in which iris recognition is possible in the outdoor environment, is referred to as an outdoor iris recognition wavelength range.

First, prior to definition of the ISO-recommended wavelength range and the outdoor iris recognition wavelength range, the terms wavelength range and wavelength band will be defined in detail.

In general, the "wavelength range" and the "wavelength band" may be used interchangeably. However, in the present invention, in order to avoid confusion, the wavelength range is defined as an arbitrarily specified wavelength range and the wavelength band is defined as a part of the arbitrarily specified wavelength range. For example, if a wavelength range of 700 to 900 nm is arbitrarily defined as an ISO-recommended wavelength range, a wavelength range of 700 to 800 nm is a part of the wavelength range of 700 to 900 nm and thus is defined as a wavelength band (in the mathematical expression, the wavelength range is a universal set and the wavelength band is a subset).

In general, in an outdoor environment, there are lights having various wavelengths from a gamma ray having a short wavelength to a radio wave having a long wavelength. As representative lights, ultraviolet light, visible light and infrared light are known. Among various wavelengths, the wavelength range of infrared light is generally 700 to 1,000 nm, but the actually used wavelength range of infrared light differs between the international organizations. Although the present invention is described based on the near infrared region (700 to 1,400 nm), mid-infrared region (1,400 to 3,000 nm) and far infrared region (3,000 to 1 mm) of International Commission on Illumination, definition of any organization suiting the object of the present invention may be used.

First, a per-wavelength distribution of solar irradiance in earth's atmosphere (see World Meteorological Organization (WMO)) was used, in order to find a wavelength band in which an iris image may be photographed even in an outdoor environment due to decrease in intensity of infrared light and visible light, which may cause reflection noise upon photographing an iris image in an outdoor environment, to a specific value or less.

Figure 3:
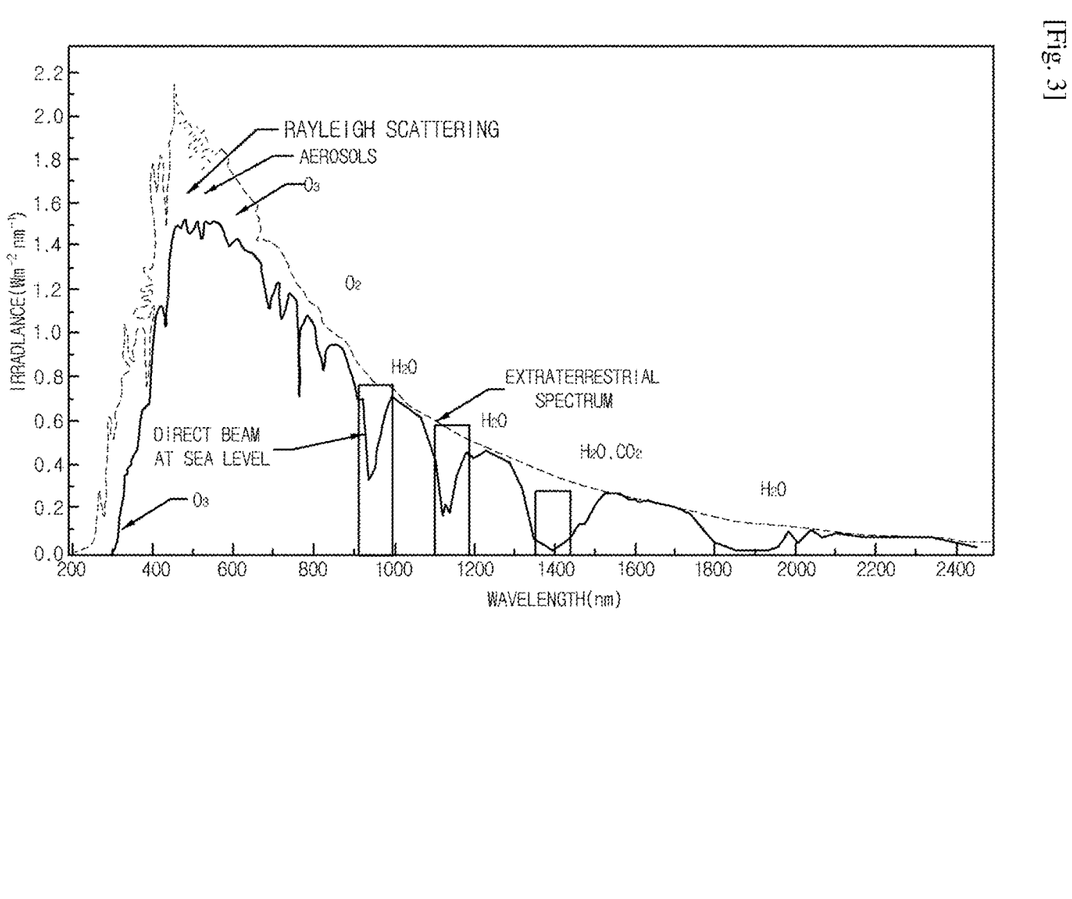
FIG. 3 is a diagram showing a solar radiation spectrum according to an embodiment of the present invention.

FIG. 3 is a diagram showing a solar radiation spectrum according to an embodiment of the present invention.

FIG. 3 shows a per-wavelength distribution of solar irradiance in earth's atmosphere, which is widely known all over the world. Although the distribution slightly differs between international organizations, any distribution suiting the object of the present invention may be used.

As shown in FIG. 3, it can be seen from the per-wavelength distribution of solar irradiance that an irradiance value is rapidly decreased in a specific infrared wavelength band (denoted by a red rectangle). In this wavelength band, since the intensity of sunlight in the outdoor environment is reduced, reflection noise of the iris image may be reduced.

Through various experiments and repeated verification, it is found that a wavelength band in which reflection noise can be reduced when the intensity of irradiance is reduced to the specific value or less even in the outdoor environment is present and an iris image having reflection noise which is reduced enough to perform iris recognition even in the outdoor environment can be acquired in this wavelength band. More specifically, the wavelength band, in which an iris image having reflection noise sufficiently reduced to perform iris recognition even in the outdoor environment may be acquired, is 920 to 1,500 nm, and, more particularly, 920 to 960 nm, 1,100 to 1,160 nm and 1,300 to 1,500 nm.

However, illuminance indicating the brightness of infrared lamp and irradiance are not proportional to each other and the wavelength band, in which reflection noise can be reduced in the outdoor environment, cannot be verified through only the per-wavelength distribution of solar irradiance in earth's atmosphere shown in FIG. 3 due to the error between the boundary values of the range of the acceptable wavelength band of an IR bandpass filter (e.g., 10 nm, 25 nm, 50 nm, etc.) and the outdoor iris recognition wavelength range by IR LED power. Thus, verification using various experiments was necessary.

Theoretically, although the iris image may be estimated to be acquired even in an outdoor environment in the infrared wavelength range of 920 nm or more through the per-wavelength distribution of solar irradiance in earth's atmosphere of FIG. 3, since there is substantially no research data related to protection of the eye of a person to be photographed from mid-infrared light and far infrared light, experiments were performed in consideration of the range of the acceptable wavelength band of the IR bandpass filter based on the near infrared region (700 to 1,400 nm) which has been used for iris recognition.

Accordingly, in the present invention, a wavelength band (920 to 1,500 nm) including a wavelength band (920 to 1,400 nm) of a near infrared region of 700 to 1,400 nm and a wavelength band (1,400 to 1,500 nm) of a mid-infrared region of 1,400 to 3,000 nm which may be technologically verified and validated is defined as an outdoor iris recognition wavelength range.

Actually, the boundary value of the wavelength may be slightly changed by a measurement error range or power of a device such as a bandpass filter or a lamp.

Next, the bandpass filter using only the above-described outdoor iris recognition wavelength range will be described.

Figure 4:
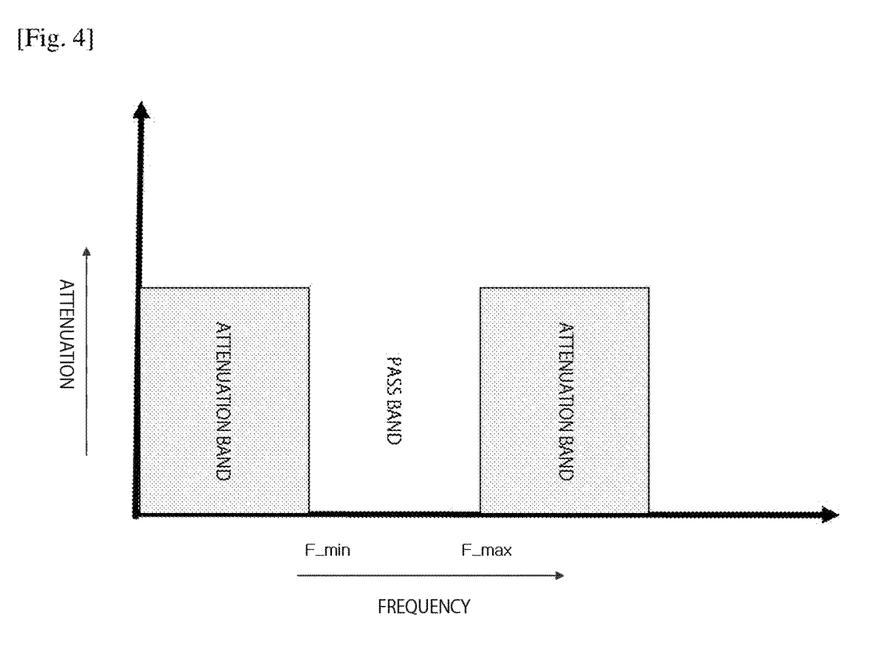
FIG. 4 is a diagram showing the principle of a bandpass filter according to an embodiment of the present invention.

FIG. 4 is a diagram showing the principle of a bandpass filter according to an embodiment of the present invention.

As shown in FIG. 4, the bandpass filter is a combination of a low-pass filter and a high-pass filter and passes only a frequency between Fmin and Fmax (Fmin<F<Fmax). Accordingly, since wavelength is the inverse of frequency, the boundary value of the wavelength passing through the bandpass filter may be calculated. Since the bandpass filter is already known, a detailed description thereof will be omitted and any bandpass filter suiting the object of the present invention may be used.

Figure 5:
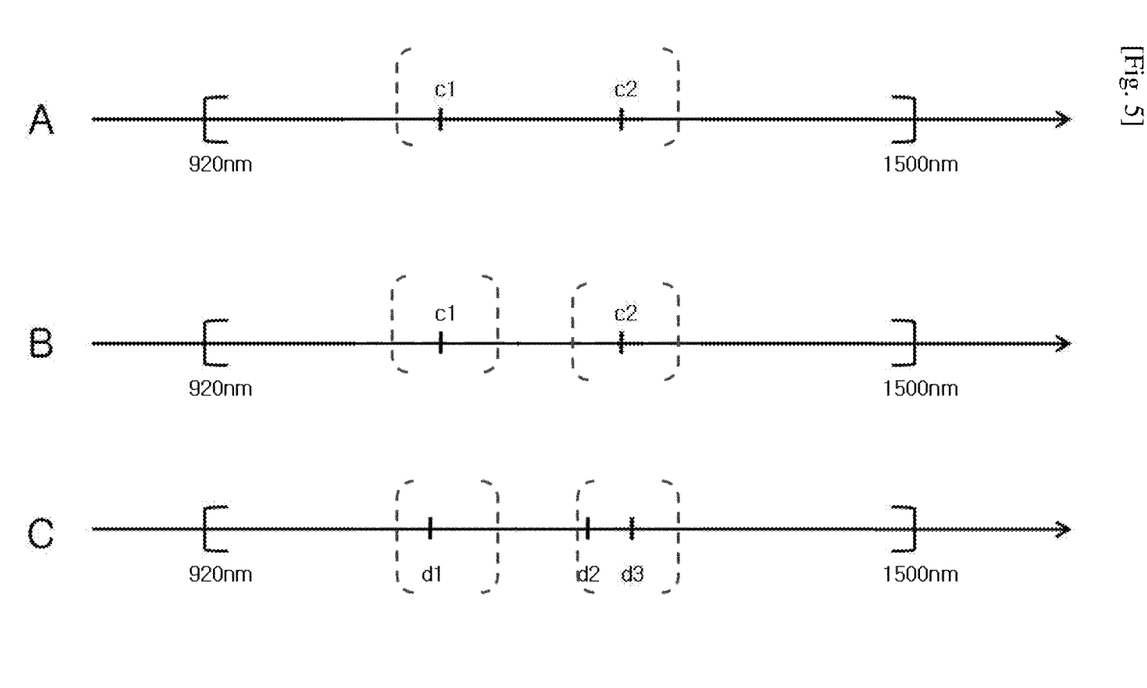
FIG. 5 is a diagram showing the principle of variously selecting an outdoor iris recognition wavelength range using a bandpass filter according to an embodiment of the present invention.

FIG. 5 is a diagram showing the principle of variously selecting outdoor iris recognition wavelength bands using a bandpass filter according to an embodiment of the present invention.

As shown in FIG. 5, A means that a wavelength band having an arbitrary width and including a wavelength band belonging to a range of c1 to c2 in an outdoor iris recognition range (920 nm to 1,500 nm) is used. For example, if the value c1 is 1,000 nm and the value c2 is 1,300 nm, a wavelength band of 1,000 nm to 1,300 nm may be actually used in a bandpass filter. However, when the wavelength band is arbitrarily increased by ±10 nm, ±25 nm, ±50 nm, etc. in a range which does not exceed 920 nm to 1,500 nm, any one of the wavelength bands (red parts) of 990 nm to 1,310 nm, 975 nm to 1,325 nm and 950 nm to 1,350 nm may be selected and used.

At this time, the bandpass filter passes only the wavelength belonging to the wavelength band of 1,000 nm to 1,300 nm plus an arbitrary width and cancels the other wavelengths.

B means that at least one of several wavelength bands obtained by adding a wavelength band having an arbitrary width to arbitrary wavelength values c1 and c2 in an outdoor iris recognition wavelength range (920 nm to 1,500 nm) is selected and used. For example, if the value of c1 is 1,000 nm, the value of c2 is 1,300 nm and the arbitrary width is ±100 nm, one bandpass filter may use wavelength bands (red parts) of 950 nm to 1,050 nm, 1050 nm to 1,150 nm, 1,150 nm to 1,250 nm and 1250 nm to 1,350 nm. At this time, one or more of the several selectable wavelength bands may be used.

Lastly, C means that only a specific wavelength of wavelengths belonging to a range from c1 to c2 of the outdoor iris recognition wavelength range (920 nm to 1,500 nm) is used. For example, 1,000 nm (d1) is selected and used from among wavelengths belonging to the range of 950 nm to 1,050 nm and wavelengths of 1,260 nm (d1) and 1,300 nm (d3) are selected from among wavelengths belonging to a range of 1,250 nm to 1,350 nm in B.

Although the bandpass filter of the outdoor iris recognition wavelength range (920 nm to 1,500 nm) may use the entire wavelength band of 920 nm to 1,500 nm, a wavelength band having an arbitrary width or arbitrary wavelengths belonging to the outdoor iris recognition wavelength range (920 nm to 1,500 nm) may be selected and used in view of economical or technical aspects and the wavelength band having the arbitrary width or the arbitrary wavelengths are determined according to the acceptable wavelength range of the bandpass filter and the wavelength band in which irradiance is decreased by a predetermined reference value or more.

Next, the iris image acquired in the ISO-recommended wavelength range (700 nm to 900 nm) and the iris image acquired in the outdoor iris recognition wavelength range (920 nm to 1,500 nm) in the outdoor environment will be compared.

Figure 6:
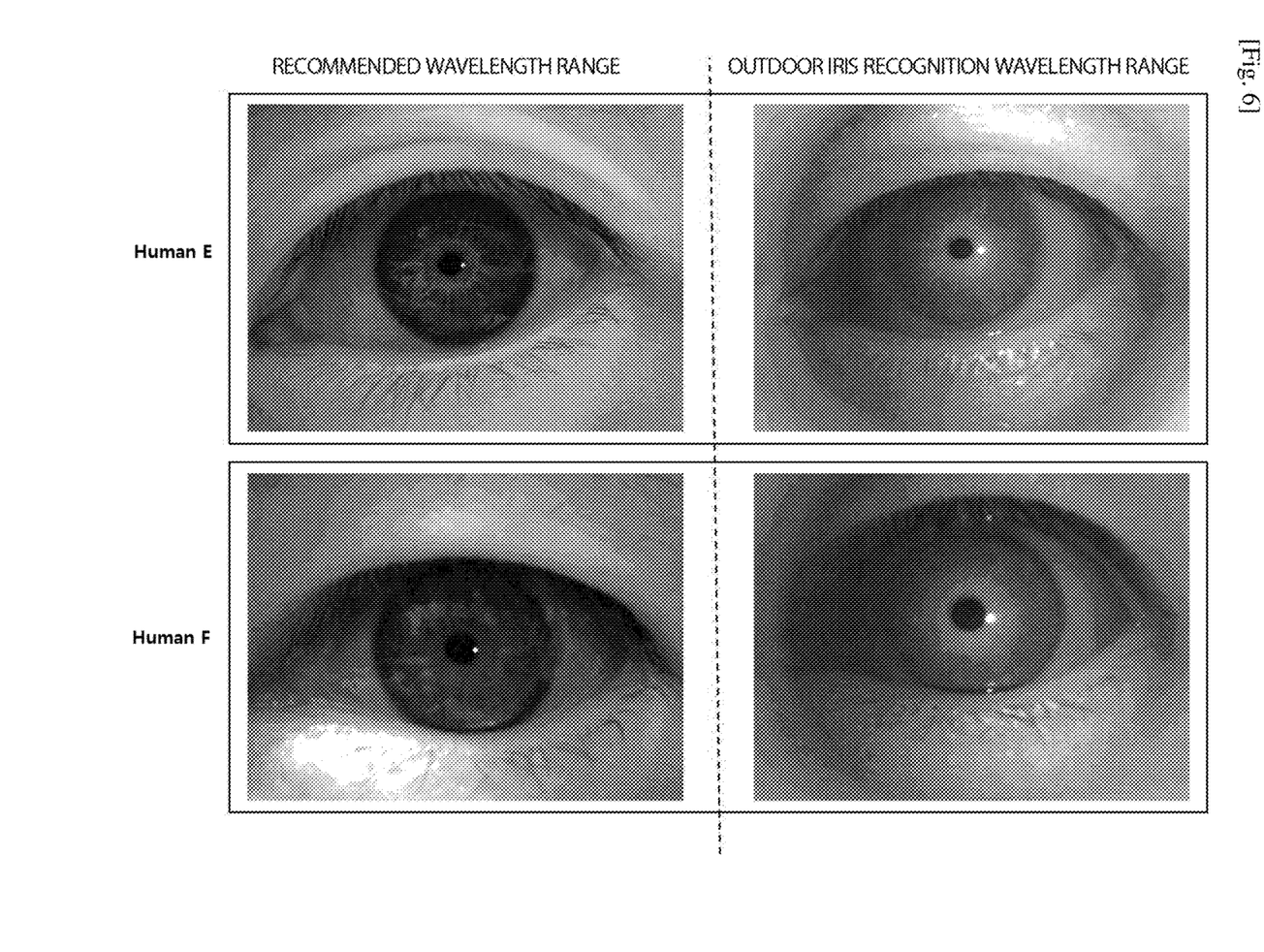
FIG. 6 is a diagram showing iris images acquired by photographing the irises of the left eyes of different persons in an ISO-recommended wavelength range (700 to 900 nm) and an outdoor iris recognition wavelength range (920 to 1,500 nm) according to an embodiment of the present invention.

FIG. 6 shows the iris images acquired by photographing the irises of the left eyes of different persons in the ISO-recommended wavelength range (700 nm to 900 nm) and the outdoor iris recognition wavelength range (920 nm to 1,500 nm) according to one embodiment of the present invention.

As shown in FIG. 6, it can be seen from the images acquired by photographing the left irises of two persons (Human E and Human F) outdoors in the recommended wavelength range that the reflected image of the surrounding environment appears around the eye. In contrast, it can be seen from the images acquired by photographing the left irises of two persons outdoors in the outdoor iris recognition wavelength range that the reflected image of the surrounding environment completely disappears around the eye. Accordingly, it can be seen that the iris can be recognized using the iris image acquired in the outdoor iris recognition wavelength range.

As a representative index for evaluating whether iris recognition is actually possible, dissimilarity measurement or a recognition rate is used. The recognition rate will first be described. In iris recognition, an error occurs when a person having an iris different from that of a registered user is erroneously determined as the iris of the same user (false acceptance rate (hereinafter, referred to as FAR)) and when a person having the same iris as a registered user is erroneously determined as another person (false rejection rate (hereinafter, referred to as "FRR")). In iris recognition, it is determined that the recognition rate increases as the two index values FAR and FRR decrease.

In dissimilarity measurement as another index, a distribution of similarity between two iris data of the same person and a distribution of similarity between the iris data of a registered person and another person are compared to measure an extent of separation between the distributions. Iris recognition is determined to be possible when the extent of separation is large.

Figure 7:
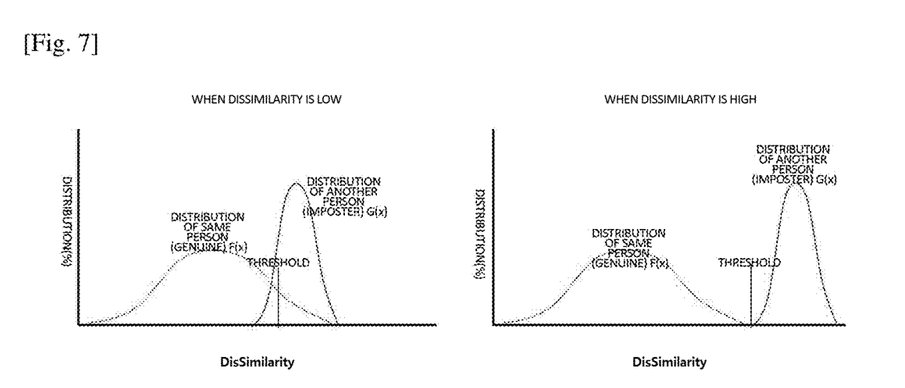
FIG. 7 is a graph illustrating dissimilarity according to an embodiment of the present invention.

FIG. 7 is a graph illustrating dissimilarity according to an embodiment of the present invention.

In the graph of FIG. 7, the left distribution indicates the distribution of similarity between two iris data of the registered person (genuine distribution) (a function indicating this distribution is referred to as $F(x)$), the right distribution indicates the distribution of similarity between the iris data of the registered person and another person (imposter distribution) (a function indicating this distribution is referred to as $G(x)$), and an arbitrary value on an x axis is referred to as a threshold (the threshold may be arbitrarily defined). In addition, small dissimilarity (x-axis value) (closer to an origin) means the same person and large dissimilarity means different persons.

In the left distribution of dissimilarity of FIG. 7, $F(x)$ and $G(x)$ overlap and do not completely separate from each other. However, in the right distribution, $G(x)$ moves in the positive direction of the x-axis (away from the origin) such that $F(x)$ and $G(x)$ do not overlap. Accordingly, the right distribution has a higher iris recognition rate.

Figure 8:
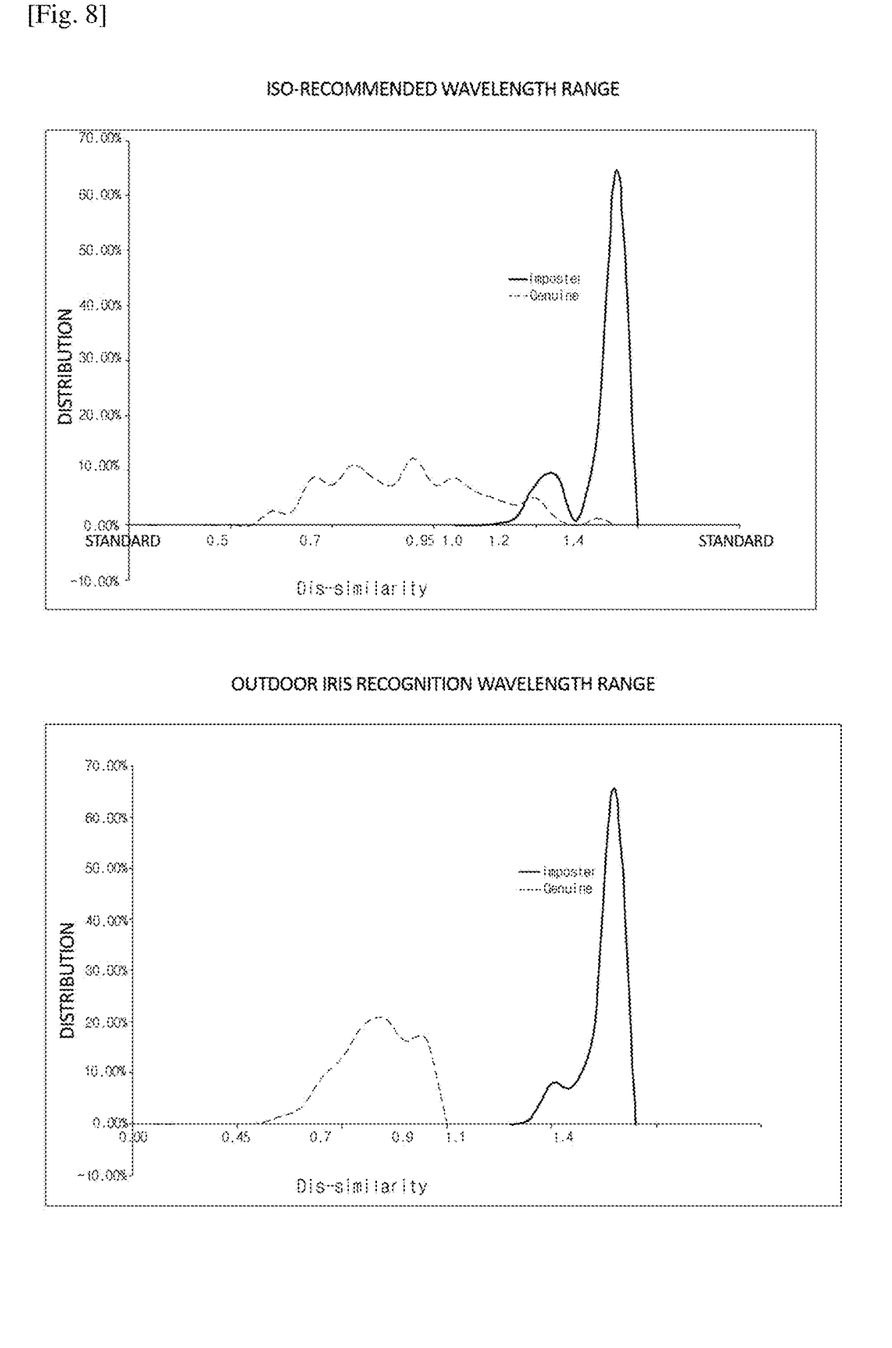
FIG. 8 is a graph showing a distribution of iris images acquired by photographing the iris of a person outdoors in an ISO-recommended wavelength range (700 to 900 nm) and an outdoor iris recognition wavelength range (920 to 1,500 nm) according to an embodiment of the present invention.

FIG. 8 is a graph showing a distribution of iris images acquired by photographing the iris of a person outdoors in an ISO-recommended wavelength range (700 to 900 nm) and an outdoor iris recognition wavelength range (920 to 1,500 nm) according to an embodiment of the present invention.

As described with reference to FIG. 7, it can be seen from FIG. 8 that, although the iris image is photographed in the same outdoor environment, the iris recognition rate of the outdoor iris recognition wavelength range (920 nm to 1,500 nm) is higher than that of the ISO-recommended wavelength range (700 nm to 900 nm).

Accordingly, reflection noise making iris recognition substantially impossible outdoors can be prevented.

Next, a camera for photographing an image for iris recognition outdoors will be described.

The camera according to the present invention is not limited to a camera and includes a camera lens or a camera module of a smart device such as a smartphone, a tablet, a PDA, a PC or a laptop which currently employs or will employ iris recognition.

In general, for image resolution necessary for iris recognition, refer to ISO standards. In the ISO standards, image resolution necessary for iris recognition is defined by the pixel number of the diameter of an iris based on a VGA resolution image.

According to the ISO standards, 200 or more pixels are defined as high quality, 170 pixels are defined as middle quality and 120 pixels are defined as low quality.

Accordingly, although a camera having a pixel number corresponding to high quality, which is capable of increasing convenience of a person to be photographed while acquiring iris images of a left eye and a right eye, is used in the present invention, since various pixel numbers are applicable according to iris image quality or characteristics of other additional devices, the pixel number is not limited to the pixel number corresponding to high quality.

In particular, recently, a high-quality camera module having resolution of 12M or 16M pixels and a transfer rate of 30 frame/sec or more is used in a digital imaging device and a smart device and is sufficient to acquire an image for iris recognition.

In order to acquire a clear iris image outdoors according to the present invention, a bandpass filter which passes only an outdoor iris recognition wavelength range and, more particularly, a wavelength band of 920 to 960 nm, a wavelength band of 1,110 to 1,160 nm and a wavelength band of 1,300 to 1,500 nm is provided.

The bandpass filter is manufactured to pass the wavelength band obtained by adding 5 nm, 10 nm, 20 nm or more to any one of the above-described wavelength bands, thereby acquiring an iris image.

As one embodiment, a bandpass filter for passing only a wavelength band of 940 nm to 950 nm in which irradiance is significantly decreased may be provided at the front stage of an image sensor of a camera or may be used only upon photographing an iris.

The band passing through the bandpass filter may be variously set as described above.

The bandpass filter is provided at one side of a passage through which an iris image passes, that is, at the front stage of a camera lens or between lenses, such that the iris image passes through the bandpass filter upon photographing an iris.

More specifically, the bandpass filter may be configured to operate only upon photographing the iris image like a generally used camera shutter or may be fixed.

That is, the bandpass filter may be configured to pass the iris image upon photographing the iris image, in order to obtain a clear iris image.

In addition, the camera may include one, two or more cameras.

Next, a lamp necessary upon photographing an image for iris recognition outdoors will be described in detail.

Although an infrared lamp is fundamentally used, a lamp unit for emitting infrared light may be further included in a device using visible light instead of infrared light.

As a method of controlling a light source, there are a method of utilizing a visible lamp in a normal photographing mode and turning the visible lamp off and turning an infrared lamp on upon photographing an iris image or a method of utilizing a visible lamp in a normal photographing mode and operating an infrared filter attached to the visible lamp to emit infrared light upon photographing an iris image.

In addition, as the infrared lamp, an infrared light source having one or more wavelengths passing through the above-described bandpass filter is provided.

Next, an apparatus for photographing an iris image using a camera indoors and outdoors in an outdoor iris recognition wavelength range will be described.

The principle of photographing the iris image using the camera indoors and outdoors in the outdoor iris recognition wavelength range will now be described in detail. First, the outdoor iris recognition wavelength range (920 nm to 1,500 nm) is used outdoors and indoors, instead of the ISO-recommended wavelength range (700 nm to 900 nm). Second, the ISO-recommended wavelength range (700 nm to 900 nm) is used indoors and the outdoor iris recognition wavelength range (920 nm to 1,500 nm) is used outdoors.

(T1) Case where the outdoor iris recognition wavelength range is used indoors and outdoors Instead of the ISO-recommended wavelength range (700 nm to 900 nm) which is generally used indoors, the iris image is photographed using the camera in the outdoor iris recognition wavelength range (920 nm to 1,500 nm) used in the present invention.

Figure 9:
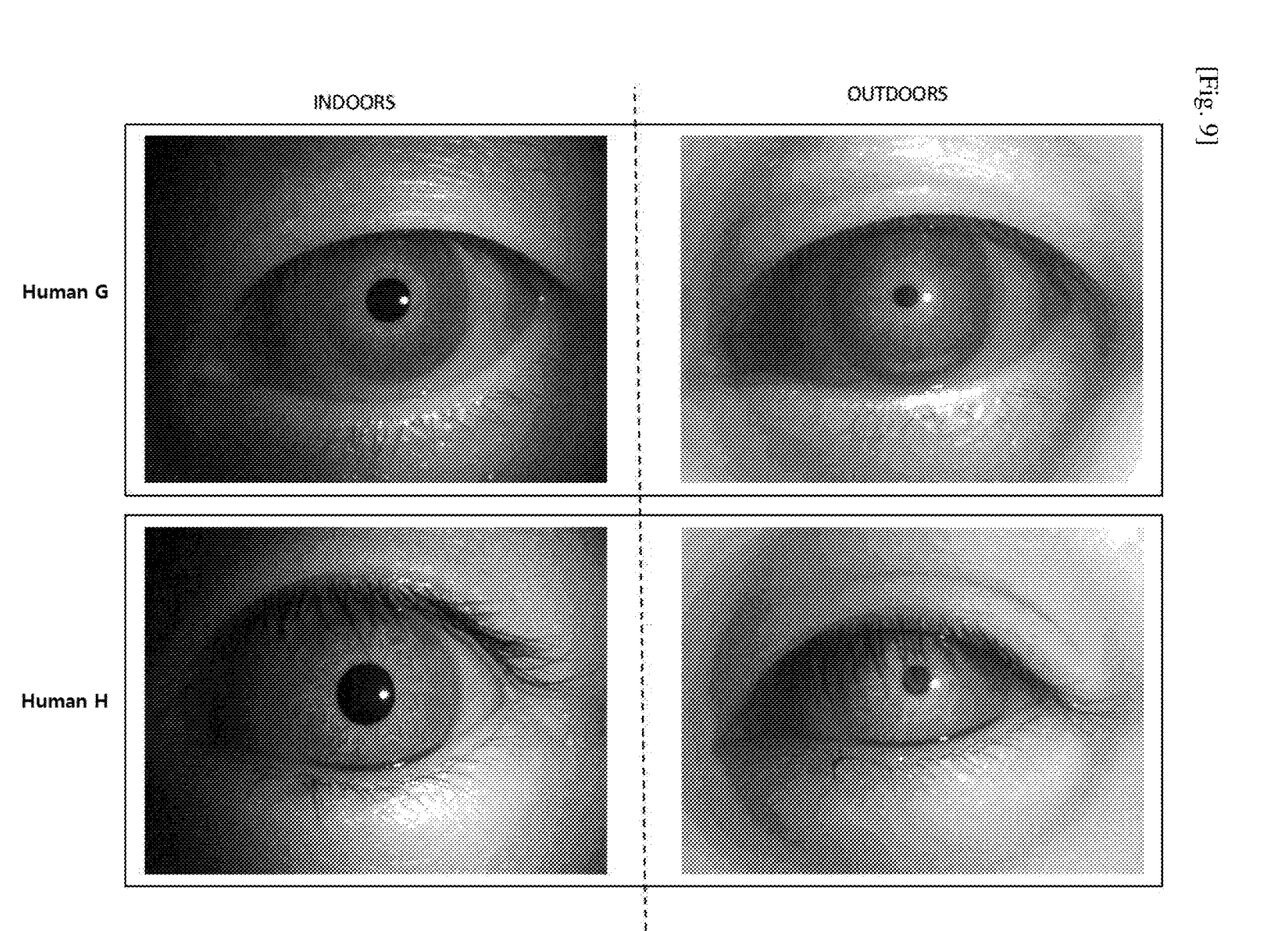
FIG. 9 is a diagram showing iris images of different persons acquired indoors and outdoors in an outdoor iris recognition wavelength range (920 to 1,500 nm) according to an embodiment of the present invention.

FIG. 9 is a diagram showing iris images of different persons acquired indoors and outdoors in the outdoor iris recognition wavelength range (920 to 1,500 nm) according to an embodiment of the present invention.

As shown in FIG. 9, it can be seen that a reflected image is not present in the iris image photographed indoors in the outdoor iris recognition wavelength range (920 to 1,500 nm) as compared to the iris image photographed outdoors in the outdoor iris recognition wavelength range (920 to 1,500 nm) and thus iris recognition is possible. More specifically, a bandpass filter for passing at least one of wavelength bands of 920 nm to 960 nm, 1,110 nm to 1,160 nm and 1,300 to 1,500 nm may be manufactured and used according to the present invention.

(T2) Case where the outdoor iris recognition wavelength range is used outdoors and the ISO-recommended wavelength range is used indoors For example, if the existing ISO-recommended wavelength range (700 nm to 900 nm) is used indoors and the outdoor iris recognition wavelength range (920 nm to 1,500 nm) is used outdoors, a selection mode for selecting an indoor photographing mode and an outdoor photographing mode is provided. The selection mode may be manually switched according to photographer's judgment or may be automatically switched using a light sensor for measuring the intensity of light or an irradiance measurement device. Since the selection mode is conventionally known, any technology suiting the object of the present invention may be used.

A bandpass filter for passing only the outdoor iris recognition wavelength range (920 nm to 1,500 nm) is provided at the front stage of the iris image sensor in the outdoor photographing mode and a bandpass filter for passing the existing ISO-recommended wavelength range (700 nm to 900 nm) is located at the front stage of the iris image sensor in the indoor photographing mode.

In the present invention, a bandpass filter used for both indoor and outdoor environments or bandpass filters respectively used for indoor and outdoor environments are manufactured and provided in front of a camera lens or at the front stage of a camera image sensor to acquire an iris image.

The present invention is characterized in that the bandpass filter is located in front of the camera lens or at the front stage of the camera image sensor upon acquiring the iris image, such that a clear iris image is acquired regardless of indoor environment, outdoor environment or irradiance.

The technical component for measuring the quality of the iris image according to the present invention is disclosed in detail in Korean Patent Publication No. 10-1030652 assigned to the present applicant and thus a detailed description thereof will be omitted.

As another embodiment of the present invention, a method of acquiring an iris image outdoors and indoors will be described.

A method of acquiring an iris image outdoors and indoors using an apparatus including a lens for receiving the iris image, an image sensor for sensing the iris image received through the lens, and a memory for storing the sensed iris image includes selecting all or a part of an outdoor iris wavelength band (920 nm to 1,500 nm) and acquiring the iris image, in which a reflected image generated upon photographing is prevented or reflection noise is reduced, using a bandpass filter using all or part of the outdoor iris wavelength band (920 nm to 1,500 nm) provided at a front stage of the image sensor.

A method of acquiring an iris image outdoors and indoors using an apparatus including a lens for receiving the iris image, an image sensor for sensing the iris image received through the lens, and a memory for storing the sensed iris image includes selecting all or a part of an outdoor iris wavelength band (920 nm to 1,500 nm), acquiring the iris image using a filter having a wavelength band of 700 nm to 900 nm upon photographing the iris image indoors, and acquiring the iris image, in which a reflected image generated upon photographing is prevented or reflection noise is reduced, using a bandpass filter using all or part of the outdoor iris wavelength band (920 nm to 1,500 nm) provided at a front stage of the image sensor outdoors upon photographing the iris image outdoors.

The present invention provides an apparatus for acquiring an iris image indoors and outdoors, which includes a lens for receiving the iris image, an image sensor for sensing the iris image received through the lens, a memory for storing the iris image sensed by the image sensor, a bandpass filter using all or a part of an outdoor iris wavelength range (920 nm to 1,500 nm) provided at a front stage of the image sensor in order to acquire the iris image, in which a reflected image generated upon photographing the iris image outdoors and indoors and, more particularly, outdoors is prevented or reflection noise is reduced, and an infrared lamp for emitting light having one or more wavelengths passing through a wavelength band of the bandpass filter, and a method thereof, thereby acquiring a clear iris image even outdoors. Therefore, the present invention has high industrial applicability.

What is claimed is:

1. An apparatus for acquiring an iris image outdoors and indoors, the apparatus comprising:

a lens for receiving the iris image;

an image sensor for sensing the iris image received through the lens;

a memory for storing the sensed iris image;

a bandpass filter that passes exclusively parts of the outdoor iris wavelength band (920 nm to 1,500 nm) provided at a front stage of the image sensor within solar radiation spectrum in order to acquire the iris image, in which a reflected image generated upon photographing the iris image outdoors is prevented or reflection noise is reduced;

and infrared lamps for emitting light having one or more wavelengths passing through a wavelength band of the bandpass filter, wherein the parts of the outdoor iris recognition wavelength band (920 to 1,500 nm) passed by the bandpass filter include at least one of a wavelength band of 920 to 960 nm, a wavelength band of 1,110 to 1,160 nm and a wavelength band of 1,300 to 1,500 nm, wherein the bandpass filter is provided at the front stage of the image sensor, and wherein the infrared lamps are used to acquire the iris image.

2. An apparatus for acquiring an iris image outdoors and indoors, the apparatus comprising:

a lens for receiving the iris image;

an image sensor for sensing the iris image received through the lens;

a memory for storing the sensed iris image;

a bandpass filter that passes exclusively parts of the outdoor iris wavelength band (920 nm to 1,500 nm) provided at a front stage of the image sensor in order to acquire the iris image, in which a reflected image generated upon photographing the iris image indoors and outdoors is prevented or reflection noise is reduced;

and infrared lamps for emitting light having one or more wavelengths passing through a wavelength band of the bandpass filter, wherein the bandpass filter is provided at the front stage of the image sensor, and wherein the infrared lamps are used to acquire the iris image.

3. An apparatus for acquiring an iris image outdoors and indoors, the apparatus comprising:

a lens for receiving the iris image;

an image sensor for sensing the iris image received through the lens;

a memory for storing the sensed iris image;

a bandpass filter that passes exclusively parts of the outdoor iris wavelength band (920 nm to 1,500 nm) provided at a front stage of the image sensor in order to acquire the iris image, in which a reflected image generated upon photographing the iris image indoors and outdoors is prevented or reflection noise is reduced;

a bandpass filter for passing a wavelength band of 700 to 900 nm for acquiring the iris image indoor; and infrared lamps for emitting light having one or more wavelengths passing through both wavelength bands of the different bandpass filters, wherein the parts of the outdoor iris recognition wavelength band (920 to 1,500 nm) include at least one of a wavelength band of 920 to 960 nm, a wavelength band of 1,110 to 1,160 nm and a wavelength band of 1,300 to 1,500 nm, wherein the bandpass filter is provided at the front stage of the image sensor, and wherein the infrared lamps are used to acquire the iris image.

4. The apparatus according to claim 3, wherein a bandpass filter for passing parts of the outdoor iris recognition wavelength band (920 to 1,500 nm) is used as the bandpass filter used upon photographing the iris image outdoors.

5. The apparatus according to claim 3, wherein a bandpass filter using parts of the outdoor iris recognition wavelength band (920 to 1,500 nm) upon outdoor photographing and a bandpass filter using a wavelength band of 700 to 900 nm upon indoor photographing are provided, and an indoor photographing mode or an outdoor photographing mode is selected according to a selection mode.

6. The apparatus according to claim 5, wherein the selection mode includes a manual mode according to photographer's judgment and an automatic selection mode using a light sensor and an irradiance measurement device.

7. A method of acquiring an iris image outdoors and indoors using an apparatus including a lens for receiving the iris image, an image sensor for sensing the iris image received through the lens, and a memory for storing the sensed iris image, the method comprising:

selecting exclusively parts of an outdoor iris wavelength band (920 nm to 1,500 nm); emitting infrared light passing through the selected wavelength band;

and acquiring the iris image, in which a reflected image generated upon photographing is prevented or reflection noise is reduced, using a bandpass filter using parts of the outdoor iris wavelength band (920 nm to 1,500 nm) provided at a front stage of the image sensor, wherein the parts of the outdoor iris recognition wavelength band (920 to 1,500 nm) include at least one of a wavelength band of 920 to 960 nm, a wavelength band of 1,110 to 1,160 nm and a wavelength band of 1,300 to 1,500 nm, wherein the step of acquiring the iris image comprises:
providing the bandpass filter at the front stage of the image sensor, and
using the infrared lamps to acquire the iris image.

8. A method of acquiring an iris image outdoors and indoors using an apparatus including a lens for receiving the iris image, an image sensor for sensing the iris image received through the lens, and a memory for storing the sensed iris image, the method comprising:

selecting parts of an outdoor iris wavelength band (920 nm to 1,500 nm) upon photographing the iris image outdoors and acquiring the iris image;

selecting a filter having a wavelength band of 700 nm to 900 nm upon photographing the iris image indoors and acquiring the iris image;

and acquiring the iris image, in which a reflected image generated upon photographing is prevented or reflection noise is reduced, using a bandpass filter that passes exclusively parts of the outdoor iris wavelength band (920 nm to 1,500 nm) provided at a front stage of the image sensor upon photographing the iris image outdoors, wherein the parts of the outdoor iris recognition wavelength band (920 to 1,500 nm) include at least one of a wavelength band of 920 to 960 nm, a wavelength band of 1,110 to 1,160 nm and a wavelength band of 1,300 to 1,500 nm, wherein the step of acquiring the iris image comprises:
providing the bandpass filter at the front stage of the image sensor, and
using the infrared lamps to acquire the iris image.

9. The method according to claim 7, wherein a filter for selectively passing a wavelength band in which irradiance decreases by a predetermined value or more in an solar irradiance spectrum is used as the bandpass filter using parts of the outdoor iris wavelength band (920 nm to 1,500 nm).

* * * * *